United States Patent [19]
Phillips

[11] Patent Number: 6,098,860
[45] Date of Patent: Aug. 8, 2000

[54] STRAP TO YOUR DASH CUPHOLDER

[76] Inventor: David X-ace Phillips, 151 W. Cactus, Amarillo, Tex. 79108

[21] Appl. No.: 09/373,008

[22] Filed: Aug. 12, 1999

Related U.S. Application Data

[63] Continuation of application No. 09/110,699, Jul. 4, 1998, abandoned.

[51] Int. Cl.[7] ........................................................ B60R 7/00
[52] U.S. Cl. .......................... 224/483; 224/482; 224/556; 224/560; 224/572; 224/926; 248/311.2
[58] Field of Search ..................................... 224/483, 482, 224/555, 556, 560, 566, 572, 926; 248/311.2

[56] References Cited

U.S. PATENT DOCUMENTS 5,511,754  4/1996  Johannsen .............................. 248/311.2
5,833,194  11/1998  Jones et al. ............................ 248/311.2

*Primary Examiner*—Gregory M. Vidovich
*Assistant Examiner*—Maerena Brevard

[57] ABSTRACT

A cup holding device includes a main beverage container holding member, conformed to hold large heavy drinking cups, two support straps are connected to one side of the main cup holding member, one strap is connected at the top of the main cup holding member and the other strap is connected at the bottom of the main cup holding member, directly below the first strap. A hook member attached to the free end of each strap hold the main cup holding member in an upright position against a motor vehicles dash. These support straps are adjustable in length to allow for the several different makes and models of motor vehicles on the road today.

3 Claims, 3 Drawing Sheets

STRAP TO YOUR DASH CUPHOLDER

RELATED APPLICATIONS

This application is a continuation of application Ser. No. 09/110,699, filing date Jul. 4, 1998 now abandoned.

FEDERALLY SPONSORED RESEARCH OR DEVELOPMENT

Not applicable

MICROFICHE APPENDIX

Not applicable

BACKGROUND OF THE INVENTION

1. Field of the Invention

The present invention relates generally to a cup holding device for vehicles. More particular, the invention is concerned with a cup holder that can be attached to the dash of motor vehicles, presenting a beverage holder body and two adjustable support straps, one attached to the top of the main cup holder body and the other strap is attached at the bottom of the main cup holder body, directly below the other strap, a hook at the end of each strap holds the cup holder in place.

2. Description of the Prior Art

This cup holder was invented to hold large cups like the large fountain drinks that are sold at fast food and convenient stores.

Most cup holders available today are not large enough or strong enough to hold the big drinks.

I have come up with this invention to eliminate having to hold the large cups, risking spilling the drink and freeing both hands for safer driving.

With the cup holder in place strapped to the dash of the vehicle, the beverage is easily within arms reach, and located up near the windshield, a person doesn't have to take their eyes off of the road to locate it.

SUMMARY OF THE INVENTION

The present invention solves the prior art problems discussed above and provides a distinct advance in the state of the art.

The preferred embodiment of the present invention includes a main cup holding member and two adjustable support straps that have hooks at the end of each strap. One end of each strap is attached on one side of the cup holding member, one is attached at the top of the main cup holding member and is intended to go up over the dash of a vehicle and attach by the hook either in the defrost vent or where the dash and windshield meet. The other strap is attached at the bottom of the main cup holding member directly below the other strap, it is intended to go down and hook along the bottom edge of the vehicles dash.

DETAILED DESCRIPTION OF A PREFERRED EMBODIMENT

Figure 1:
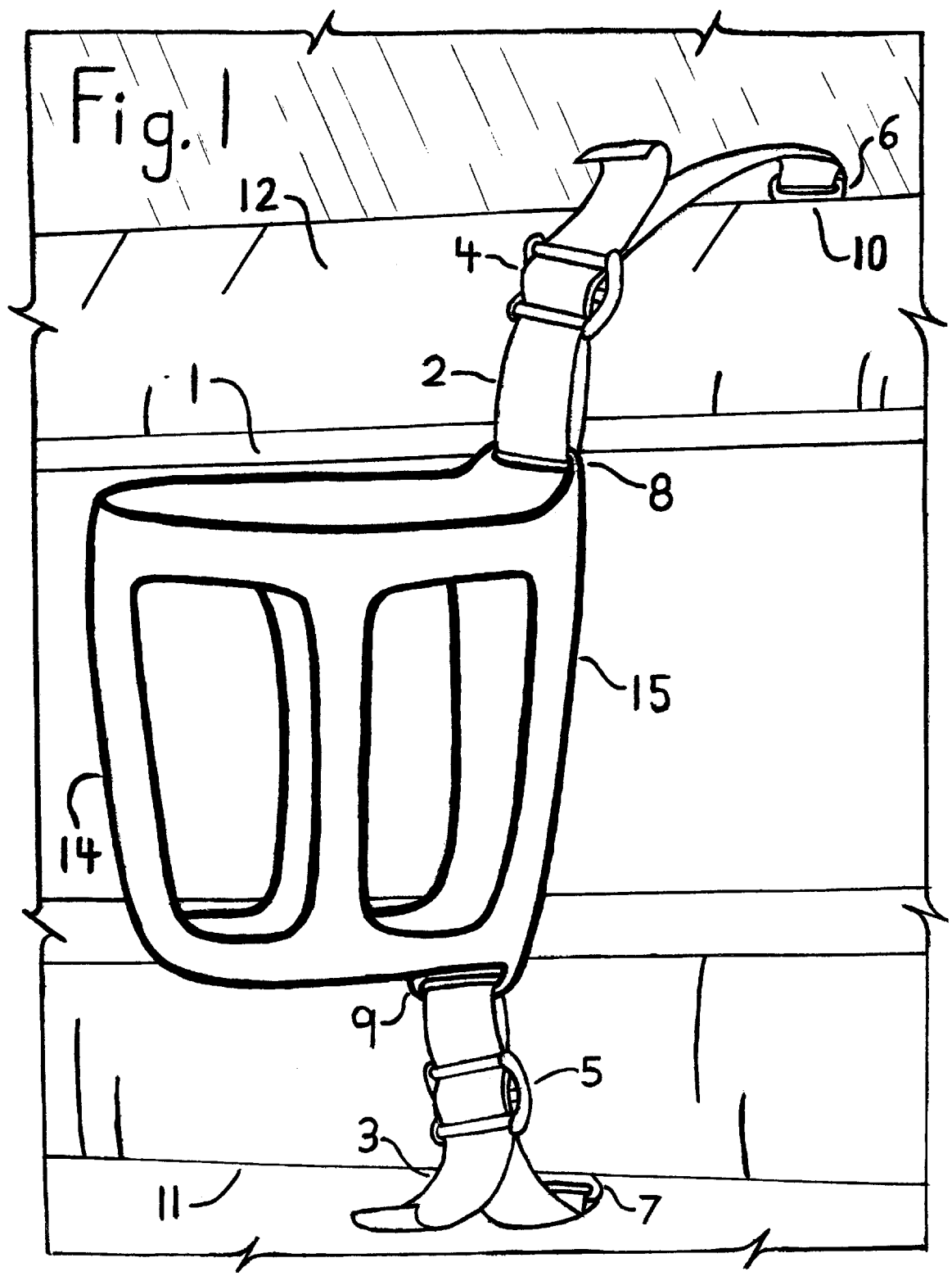
FIG. 1 is a perspective view of the preferred cup holder apparatus in accordance with the present invention shown in use, strapped to the dash of a vehicle.

Referring to the drawings in detail, FIG. 1 illustrates a cup holder apparatus in accordance with the present invention in use, held to the dash 12 of a motor vehicle, by the two adjustable support straps 2,3.

Preferably the main beverage container holding member 1 is made of plastic and the support straps 2,3 are made of nylon. Although there are several natural and synthetic materials that could be used.

Figure 2:
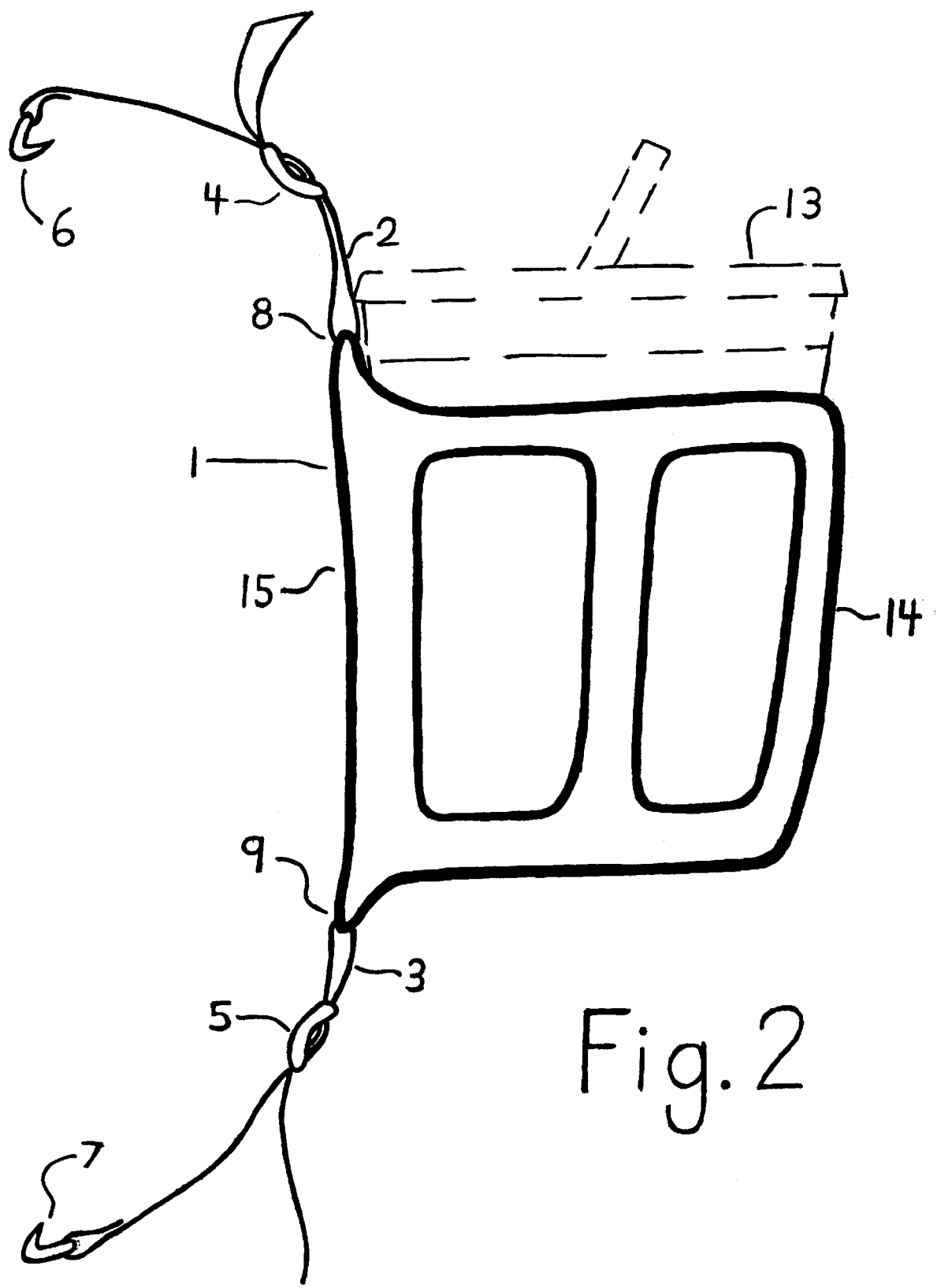
FIG. 2 is a side view shown holding a large beverage container illustrated in phantom lines.

FIGS. 1 and 2 show the cup holding apparatus 1 in an upright position, capable of holding a large beverage container 13. The main beverage container holding member 1 has a front side 14 and a rearward side 15 and is held in place by two support straps 2,3 that are connected to the rearward side 15 of the main beverage container holding member. One strap 2 having first and second opposite ends is connected at the top of the main beverage container holding member by the first end 8 and having a hook member 6 connected to the second end of strap 2. The hook 6 is held to the vehicles dash at the point where the dash and windshield meet 10, or in the opening in the dash for the defrost vent. Strap 2 is threaded through a buckle 4 so it can be adjusted in length to allow for all the different dash configurations of all the different makes and models of vehicles. The second of the two straps 3 also having first and second opposite ends is connected to the bottom of the main beverage container holding member 1 directly below the first strap 2 by said first end 9 and the second end having the means of a hook 7 holds to the bottom edge 11 of a vehicle's dash 12. The second strap 3 is also threaded through a buckle 5 so it can be adjusted in length to adapt to the variation of vehicle dashes.

Figure 3:
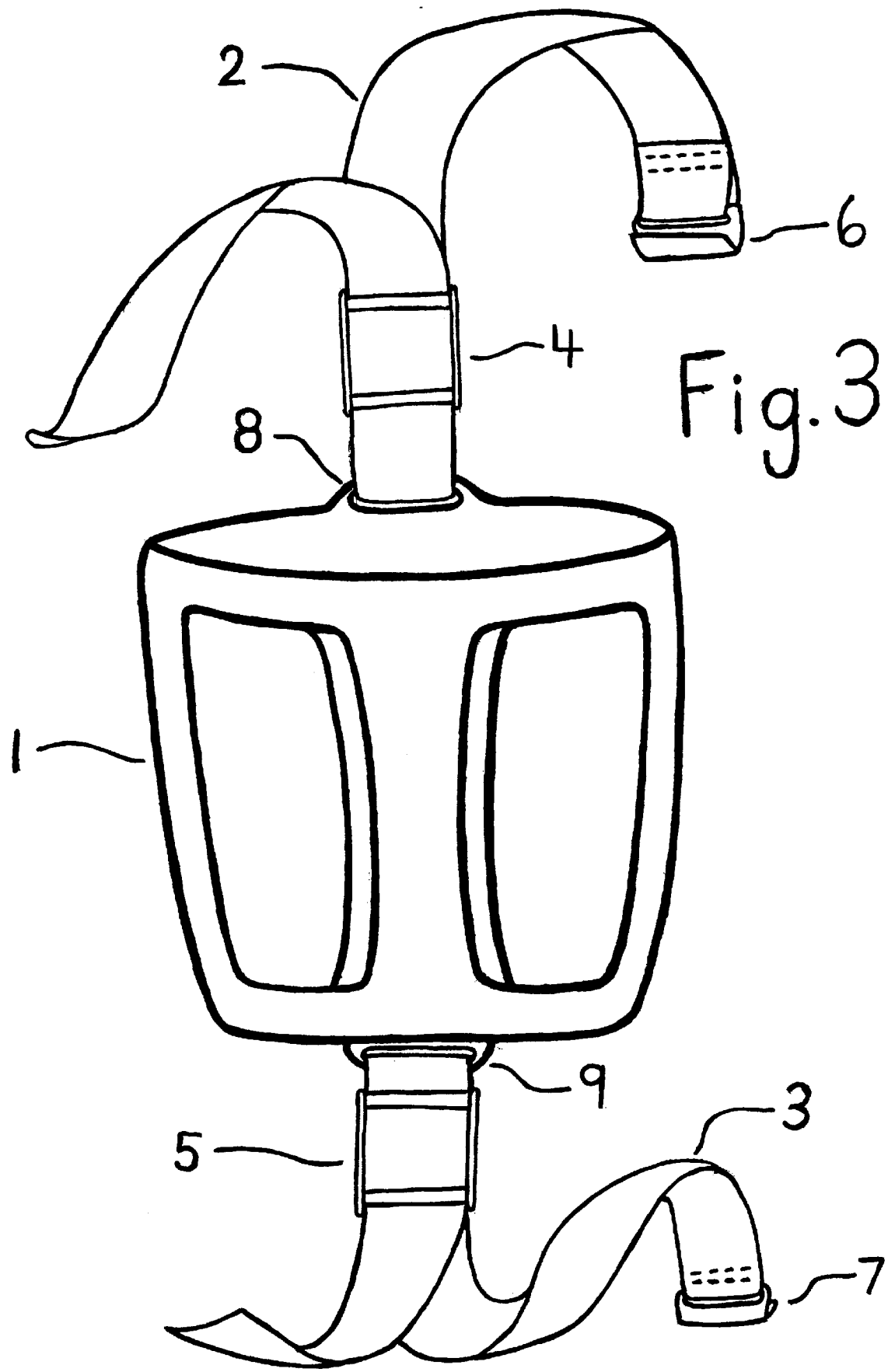
FIG. 3 is a front view of the cup holder apparatus showing each of it's individual parts.

FIG. 3 shows the cup holding apparatus identifying each individual part and their relationship with each other that together make up the invention being described;

The main cup holding member 1 preferably made of plastic is conformed to house beverage containers of various size and shape. The two straps 2,3 preferably made of nylon are about ¾ of an inch wide and several inches long, these straps have first and second opposite ends and are connected to the main cup holding member 1 by said first ends, one strap 2 is connected at the top of the cup holding member 1. The other strap 3 is connected to the bottom of the cup holding member 1 directly below strap 2. The second end of the two straps 2,3 have hooks 6,7 preferably made of plastic, connected to each of them. The straps 2,3 are threaded through buckles 4,5 also preferably made of plastic, allowing the straps 2,3 to be adjustable in length.

The following is claimed as new and desired to be secured by Letters Patent:

1. A beverage container supporting device for securing on a dashboard of a motor vehicle comprising:

a main beverage container holding member having a top ring, a bottom wall, and side sections therebetween, said ring defining an opening therethrough in which beverage containers are insertable;

said ring, bottom wall, and side sections are configured to support and retain beverage containers therein;

means for supporting said main beverage container holding member on a dashboard, said supporting means including:

two straps, one of said straps is connected to the top ring and the other of said straps is connected to the bottom wall, each said strap having a first end connected with said main beverage container holding member and a second end having hook means connected thereto for hooking on the dashboard of a vehicle;

wherein each said strap contains a buckle for adjusting the length of said strap.

2. A beverage container supporting device according to claim 1, wherein said main beverage container holding member is composed of plastic and said straps are composed of nylon.

3. A beverage container supporting device comprising:
- a main beverage container holding member having a top ring, a bottom wall, and side sections therebetween, said ring defining an opening therethrough in which beverage containers are insertable;
- said beverage container holding member having a front side, a rear side, and two support straps, each strap having an adjustment buckle, a first end and an opposite second end;
- said first end of one of said straps is connected to said rear side along the top of said beverage container holding member through a perforated hole and said second end including a hook member attachable to a defrost vent or the top edge of the dashboard of a vehicle;
- said first end of the other of said straps is connected to said rear side along the bottom of said beverage container holding member through a perforated hole and said second end including a hook member attachable to a bottom edge of the dashboard of the vehicle;
- wherein the main beverage container holding member is held in an upright position with said rear side of said beverage container holding member against the dash of the vehicle.

* * * * *